(12) United States Patent
Ionescu et al.

(10) Patent No.: US 11,584,653 B2
(45) Date of Patent: Feb. 21, 2023

(54) SILICON MATERIAL AND METHOD OF MANUFACTURE

(71) Applicant: ionobell, Inc., San Jose, CA (US)

(72) Inventors: Robert C. Ionescu, San Jose, CA (US); Chueh Liu, San Jose, CA (US)

(73) Assignee: ionobell, Inc., San Jose, CA (US)

( * ) Notice: Subject to any disclaimer, the term of this patent is extended or adjusted under 35 U.S.C. 154(b) by 0 days.

(21) Appl. No.: 17/525,769

(22) Filed: Nov. 12, 2021

(65) Prior Publication Data

US 2022/0153594 A1 May 19, 2022

Related U.S. Application Data

(63) Continuation-in-part of application No. 17/322,487, filed on May 17, 2021, which is a continuation of application No. 17/097,814, filed on Nov. 13, 2020, now Pat. No. 11,066,305.

(51) Int. Cl.
| | |
|---|---|
| *H01M 4/02* | (2006.01) |
| *C01B 33/02* | (2006.01) |
| *H01M 4/38* | (2006.01) |
| *H01M 4/36* | (2006.01) |
| *H01M 4/583* | (2010.01) |
| *B82Y 40/00* | (2011.01) |
| *C01B 32/20* | (2017.01) |
| *B82Y 30/00* | (2011.01) |

(52) U.S. Cl.
CPC ............. *C01B 33/02* (2013.01); *H01M 4/366* (2013.01); *H01M 4/386* (2013.01); *H01M 4/583* (2013.01); *B82Y 30/00* (2013.01); *B82Y 40/00* (2013.01); *C01B 32/20* (2017.08); *C01P 2004/32* (2013.01); *C01P 2004/64* (2013.01); *C01P 2004/84* (2013.01); *C01P 2006/16* (2013.01); *H01M 2004/021* (2013.01)

(58) Field of Classification Search
CPC ........................................................ H01M 4/02
See application file for complete search history.

(56) References Cited

U.S. PATENT DOCUMENTS

| | | |
|---|---|---|
| 6,060,680 A | 5/2000 | Turner et al. |
| 7,087,346 B2 | 8/2006 | Barker et al. |
| 7,097,939 B2 | 8/2006 | Ferreira et al. |
| 8,012,676 B2 | 9/2011 | Yoshiki et al. |
| 9,666,855 B2 | 5/2017 | Voillequin et al. |

(Continued)

FOREIGN PATENT DOCUMENTS

CN 104300125 A 1/2015

OTHER PUBLICATIONS

Ball, Philip, "Silicon seduced from silica: Synthetic silicon could be cheaper and more delicate" Nature, May 19, 2003, 2 pages.

(Continued)

*Primary Examiner* — Jacob B Marks
(74) *Attorney, Agent, or Firm* — Jeffrey Schox; Randy Mehlenbacher

(57) ABSTRACT

A silicon material can include a composition with at least about 50% silicon, at most about 45% carbon, and at most about 10 % oxygen. The silicon material can have an external expansion that is less than about 40%. The silicon material can include silicon nanoparticles, which can cooperatively form clusters. The silicon nanoparticles can be porous.

19 Claims, 3 Drawing Sheets

(56) References Cited

U.S. PATENT DOCUMENTS

| | | |
|---|---|---|
| 9,765,271 B2 | 9/2017 | Myrick |
| 10,263,249 B2 | 4/2019 | Kim et al. |
| 10,756,330 B2 | 8/2020 | Wang et al. |
| 10,763,501 B2 | 9/2020 | Feaver et al. |
| 10,777,807 B2 | 9/2020 | Haufe |
| 11,133,493 B2 | 9/2021 | Sonntag et al. |
| 2008/0299455 A1 | 12/2008 | Shiozaki et al. |
| 2012/0244436 A1 | 9/2012 | Kerlau |
| 2012/0315538 A1* | 12/2012 | Chiang ............. H01M 10/0525 264/43 |
| 2015/0099187 A1 | 4/2015 | Cui et al. |
| 2015/0155538 A1* | 6/2015 | Tang ................... H01M 50/411 429/188 |
| 2016/0308205 A1 | 10/2016 | Canham et al. |
| 2017/0194631 A1 | 7/2017 | Favors et al. |
| 2018/0083272 A1 | 3/2018 | Son et al. |
| 2018/0097229 A1 | 4/2018 | Jo et al. |
| 2018/0342757 A1 | 11/2018 | Choi et al. |
| 2019/0097222 A1 | 3/2019 | Feaver et al. |
| 2019/0326593 A1 | 10/2019 | Ozkan et al. |
| 2020/0194749 A1 | 6/2020 | Ogata et al. |
| 2020/0313175 A1 | 10/2020 | Shin et al. |
| 2020/0313193 A1 | 10/2020 | Shin et al. |
| 2020/0358100 A1 | 11/2020 | Duong et al. |
| 2020/0388846 A1 | 12/2020 | Kim et al. |
| 2021/0057736 A1 | 2/2021 | Feaver et al. |
| 2021/0075055 A1 | 3/2021 | Duong et al. |
| 2021/0114886 A1 | 4/2021 | Rohani et al. |
| 2021/0143439 A1* | 5/2021 | Kim ....................... H01M 4/134 |
| 2021/0234173 A1 | 7/2021 | Wang et al. |
| 2021/0320320 A1 | 10/2021 | Yushin et al. |
| 2021/0344003 A1 | 11/2021 | Yushin et al. |

OTHER PUBLICATIONS

Campbell, Brennan et al. "Carbon-Coated, Diatomite-Derived Nanosilicon as a High Rate Capable Li-ion Battery Anode", Scientifc Reports, 6: 33050, 9 pages.

Dai, Fang et al. "Minimized Volume Expansion in Hierarchical Porous Silicon upon Lithiation", ACS Appl. Mater. Interfaces 2019, 11, pp. 13257-13263.

Darghouth, A. et al. "High Purity Porous Silicon Powder Synthesis by Magnesiothermic Reuction of Tunisina Silica Sand", Silicon, Research Gate, Apr. 2020, 11 pages.

Evonik, Aerosil—Fumed Silica—Technical Overview, 104 pages.

Favors, Zachary "Scalable Synthesis of Nano-Silicon from Beach San for Long Cycle Life Li-ion Batteries" Scientific Reports, 4: 5623, 7 pages.

Favors, Zachary et al. Towards Scalable Binderless Electrodes: Carbon Coated Silicon Nanofiber Paper via Mg Reduction of Electrospun SiO2 Nanofibers, Scientifc Reports, 5: 8246, 7 pages.

Jia, Haiping et al., "A novel approach to synthesize micrometer-sized porous silicon as a high performance anode for lithium-ion batteries" Nano Energy 50 (2018) pp. 589-597.

Li, Changling et al. "Silicon Derived from Glass Bottles as Anode Materials for Lithium Ion Full Cell Batteries", Scientific Reports, 7:917, 11 pages.

Wang, Wei et al. "Monodisperse Porou Silicon Spheres as Anode Materials for Lithium Ion Batteries" Scientific Reports, 5: 8781 6 pages.

Wikipedia definition for Porous Silicon, 8 pages.

Zhang, Tianwen "Porous silicon nano-aggregate from silica fume as an anode for high energy lithium-ion batteries" RSC Adv. 2016, 6, 30577-30581.

Andersen, Hanne Flaten, et al., "Silicon-Carbon composite anodes from industrial battery grade silicon", Scientific Reports (2019) 9:14814.

Bai, Yangzhi, et al., "A high-performance silicon/carbon composite as anode materials for lithium ion batteries", Nano Express 2(2021) 01021.

Choi, Insoo, et al., "Fading mechanisms of carbon-coated and disproportionated Is/SIOx negative electrode (SI/SiOx/C) in Li-ion secondary batteries: Dynamics and component analysis by TEM", Electrochimica Acta 85 (202) 369-376.

Tong, Ling, et al., "Interface Engineering of Silicon/Carbon Thin-Film Anodes for High-Rate Lithium-Ion Batteries", ACS Apps. Mater. Interfaces 2020,12, 29242-29252.

Haregerwoin, Atetegeb Meazah, et al., "Electrolyte additives for lithium ion battery electrodes: progress and perspectives", The Royal Society of Chemistry 2016, Energy Environ. Sci. 2016, 9, 1955-1988.

Hyung, Yoo E., et al., "Flame-retardant additives for lithium-ion batteries", Journal of Power Sources 119-121 (2003) 383-387.

Kang, M., et al., "Intrinsically conductive polymer binders for electrochemical capacitor application", The Royal Society of Chemistry 2014, 4, 27939-27945.

Kim, Sang Woo, et al., "Current Collectors for Flexible Lithium Ion Batteries: a Review of Materials", J. Electrochemical. Sci. Techno. 6(1), 1-6 (2015).

Nguyen, Van At, et al., "Review-Conducting Polymer-Based Binders for Lithium-Ion Batteries and Beyond", Journal of the Electrochemical Society, 2020 167 065501.

Tseng, Yu-Hsien, et al., "On-site coagulation gel polymer electrolytes with a high dielectric constant for lithium-ion batteries", Journal of Power Sources 480 (2020) 228802.

Wang, Fei, et al., "One-pot solution synthesis of carbon-coated silicon nanoparticles as an anode material for lithium-ion batteries", Chem. Commun., 2020, 56, 1109-1112.

Yan, Zheng, "Silicon Li-ion Anode Materials via Spray Drying and Magnesiothermic Reduction", published on Jun. 2019, Chemical and Environmental Engineering, pp. 1-106).

Bux, Sabah, et al., "Nanostructured Bulk Silicon as an Effective Thermoelectric Material", Adv. Func. Mater. 2009, 19, 2445-2452.

Gauthier, Magali, et al., "A low-cost and high performance ball-milled S-based negative electrode for high energy Li-ion batteries", Energy Environ. Sci., 2013, 6, 2145-2155.

Gauthier, Magali, et al., "From SI-wafers to cheap and efficient Is electrodes for Li-ion batteries", Journal of Power Sources 256 (2014) 32-36.

Jang, Hee Dong, et al., "Aerosol-Assisted Extraction of Silicon Nanoparticles from Wafer Slicing Waste for Lithium Ion Batteries", Scientific Reports, 5 : 9431, Mar. 30, 2015.

Lu, Yang, et al., "Cold welding of ultra thin gold nanowires", Nature Nanotechnology, vol. 5, Mar. 2010.

Shen, Xiaohui, et al., "Research progress on silicon/carbon composite anode materials for lithium-ion battery", Journal of Energy Chemistry 27 (2018) 1067-1090.

Wang, Dingsheng, et al., "High performance amorphous-Si@SiOx/C composite anode materials for Li-ion batteries derived from ball-milling and in situ carbonization", Journal of Power Sources 256 (2014) 190-199.

Barbehenn, George H., et al., "Battery Conditioner Extends the Life of Li-Ion Batteries", Linear Technology Magazine, Dec. 2009, pp. 29-30.

Li, Qiuyan, et al., "Failure Analysis and Design Principles of Silicon-Based Lithium-Ion Batteries Using Micron-Sized Porous Silicon/Carbon Composite", SSRN, posted Jun. 30, 2022, https://papers.ssm.com/sol3/papers.cfm? abstract_id=4150565.

McBrayer, Josefine D., et al., "Calendar aging of silicon-containing batteries", Nature Energy.vol. 6, Sep. 2021, 866-872, www.nature.com/natureenergy.

Scheffler, Sören, et al., "Calendering of Silicon-Containing Electrodes and Their Influence on the Mechanical and Electrochemical Properties", Batteries 2022, 8, 46. https://doi.org/10.3390/batteries8050046, published May 18, 2022.

Tan, Darren H.S., et al., "Carbon-free high-loading silicon anodes enabled by sulfide solid electrolytes", Science 373, 1494-1499 (2021) Sep. 24, 2021.

* cited by examiner

SILICON MATERIAL AND METHOD OF MANUFACTURE

CROSS-REFERENCE TO RELATED APPLICATIONS

This application is a continuation-in-part of U.S. patent application Ser. No. 17/322,487, filed 17 May 2021 which is a continuation of U.S. patent application Ser. No. 17/097,814, filed 13 Nov. 2020, each of which is incorporated in its entirety by this reference.

TECHNICAL FIELD

This invention relates generally to the silicon field, and more specifically to a new and useful system and method in the silicon field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

The silicon material can include one or more particles, where each particle can include silicon, dopants, stabilizing agents, and/or any suitable elements or materials.

Figure 3:
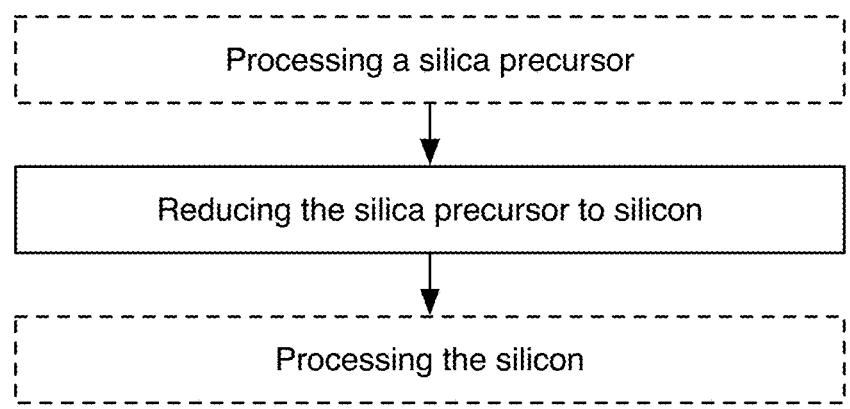
FIG. 3 is a schematic representation of an embodiment of the method.

As shown in FIG. 3, the method can include reducing a silica precursor. The manufacturing method can optionally include processing the silica precursor, processing the silicon, and/or any suitable steps.

The silicon material is preferably used as (e.g., included in) an anode material (e.g., an anode slurry) in a battery (e.g., a Li-ion battery). However, the silicon material can additionally or alternatively be used for photovoltaic applications (e.g., as a light absorber, as a charge separator, as a free carrier extractor, etc.), as a thermal insulator (e.g., a thermal insulator that is operable under extreme conditions such as high temperatures, high pressures, ionizing environments, low temperatures, low pressures, etc.), for high sensitivity sensors (e.g., high gain, low noise, etc.), as a radar absorbing material, as insulation (e.g., in buildings, windows, thermal loss and solar systems, etc.), for biomedical applications, for pharmaceutical applications (e.g., drug delivery), as an aerogel or aerogel substitute (e.g., silicon aerogels), and/or for any suitable application. For some of these applications, the silicon material can be oxidized into silica (e.g., $SiO_2$ that retains a morphology substantially identical to that of the silicon material) and/or used as silicon. The silicon can be oxidized, for example, by heating the silicon material (e.g., in an open environment, in an environment with a controlled oxygen content, etc.) to between 200 and 1000° C. for 1-24 hours. However, the silicon could be oxidized using an oxidizing agent and/or otherwise be oxidized.

2. Benefits

Variations of the technology can confer several benefits and/or advantages.

First, variants of the technology can enable large internal surface area (e.g., porous interior, Brunauer-Emmett-Teller (BET) surface area of the internal surfaces that is greater than about 10 $m^2$/kg, surface that is not directly exposed to the external environment, configured to achieve a low external silicon expansion such as less than 50% expansion, configured to enable expansion into a void space within the internal volume, etc.) and low external surface area (e.g., surface that is directly exposed to the external environment, BET surface area is less than about 150 $m^2$/kg, measured BET for the particle is less than about 150 $m^2$/kg, etc.) silicon material. In a specific example, the presence of carbon dopants within silica precursor can lead to local heating effects and/or local hot spots which can melt and/or fuse the silicon material which can influence the surface areas (e.g., internal and/or external), morphology, and/or other properties of the silicon material and/or process of forming said material.

Second, variants of the technology can include dopants (e.g., carbon dopants) which can impact (e.g., increase, decrease) a conductivity (e.g., electron conductivity, ion conductivity, etc.) of the silicon material.

Third, variants of the technology can include dopants (e.g., carbon dopants) that can modify (e.g., inhibit, promote, etc.) the formation of and/or extent of silicon crystallization (e.g., promote the formation of amorphous silicon, promote the formation of crystalline silicon, etc.).

Fourth, variants of the technology can increase a stability of the silicon material, which can enable the silicon material to be used for cycling a battery a predetermined number of times (e.g., a greater number of times than would be possible without the inclusion of or presence of dopants). For example, the silicon material can achieve a high cyclability (e.g., ability to charge and discharge between two voltages at least 100, 200, 300, 500, 1000, 2000, 5000, 10000, >10000 times; a capacity retention is substantially constant such as greater than about 70% over a predetermined number of cycles; a coulombic efficiency is substantially constant across cycles; lithium insertion into and lithium extracted from the anode during charging and discharging are substantially equal; etc.) when integrated in a battery (e.g., as an anode thereof). However, the silicon material can enable any suitable cyclability.

However, variants of the technology can confer any other suitable benefits and/or advantages.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30%, etc. of a reference), or be otherwise interpreted.

3. Silicon Material

The silicon material 10 can include one or more particles 100, where each particle can include silicon, dopants 200, stabilizing agents 300, and/or any suitable elements or materials. The silicon material can function as (e.g., be used for) energy storage (e.g., as a material for a battery anode), for photovoltaic applications, as a thermal insulator, for material absorption and/or release, as an aerogel, and/or can otherwise function. The silicon material can include a single particle, a plurality of particles (e.g., a given mass of particles, a given volume of particles, a given number of moles of particles, a given number of particles, etc.), and/or to any suitable particles. The silicon material can be an alloy, a composite, pure (or high purity) silicon, and/or can have any composition.

The silicon material is preferably majority silicon (e.g., at least about 50% Si such as 60%, 65%, 70%, 75%, 80%, 90%, 95%, 97.5%, 99%, 99.9%, 85-93%, 50-95%, 80-95%, values or ranges therebetween, etc.). The silicon concentration (e.g., as a percentage) of the silicon material can refer to a mass percent, purity percent, volume percent, stoichiometric ratio (e.g., stoichiometric percent), and/or any suitable percentage. However, the silicon material can be a plurality silicon (e.g., more silicon than any other constituent but not greater than 50% silicon), and/or have any suitable silicon concentration.

The silicon material (and/or free silicon thereof) can be amorphous, crystalline (e.g., polycrystalline, monocrystalline, pseudocrystalline, etc.), and/or have any suitable structure. In a specific example, the silicon material (or particles thereof) can include regions that are amorphous and crystalline regions. In related examples, the crystallinity can be influenced (e.g., controlled by) the presence (and/or absence) of, the identity of (e.g., type), the concentration of (e.g., local concentration, average concentration, etc.), and/or any suitable property of the dopants, stabilizing agents, impurities, and/or other constituents. As an illustrative example, the inclusion of carbonaceous dopants can lead to regions of and/or a greater degree of amorphous silicon.

The dopant(s) 200 can function to modify a crystallinity of, modify (e.g., increase, decrease) a conductivity and/or transport (e.g., thermal, electrical, ionic, atomic, etc. conductivity) of, modify (e.g., increase, decrease) a stability (e.g., thermal stability, mechanical stability, etc.) of the silicon material (e.g., by absorbing stress or strain during expansion and/or contraction of the silicon material, etc.), modify (e.g., increase, decrease, etc.) an ability of the silicon material to form an SEI (solid electrolyte interphase) layer (e.g., before and/or during battery operation), modify a quality (e.g., stability, uniformity, tensile stress accommodation, compressive stress accommodation, etc.) of an SEI layer, modify (e.g., enhance, decrease, homogenize, etc.) coating growth on the silicon material, and/or can otherwise modify a property of the silicon material. For example, a dopant (such as carbon, carbonaceous dopant, etc.) can absorb stress, which can help or enable the silicon material (e.g., particles) to stay more intact, accommodate expansion stress (e.g., without substantially breaking an SEI layer, without substantially degrading the particles, etc.), and/or can otherwise influence the silicon material. In another example, a dopant can improve a conductivity and/or transport (e.g., of an ion, of electricity, etc.) through a silicon material. For instance, the dopant can increase the conductivity and/or transport by less than 0.01%, about 0.01%, about 0.05%, about 0.1%, about 0.5%, about 1%, about 5%, about 10%, about 50%, about 100%, about 500%, values therebetween greater than 500% and/or by any suitable amount relative to undoped silicon material. The amount or extent of impact that the dopants have on properties of the silicon material and/or its applications (e.g., in a battery anode formed from the silicon material) can depend on the dopant distribution, dopant material, dopant concentration, and/or any suitable dopant properties.

The silicon material preferably includes at most about 45% of dopant (e.g., (e.g., 45%, 40%, 30%, 25%, 20%, 15%, 10%, 5%, 2%, 1%, 0.5%, 0.1%, 2-10%, etc.). However, the silicon material can additionally or alternatively include greater than 45% dopant. The dopant concentration can refer to a total dopant concentration (e.g., for all dopants when more than one dopant is included), a dopant concentration for a particular dopant, and/or any suitable concentration. The dopant concentration can depend on a target conductivity (e.g., a target electrical conductivity, a target ionic conductivity, etc.), a characteristic particle size, a stabilizing agent concentration, a target mechanical property of the silicon material (e.g., a target mechanical compliance, a target resilience to mechanical stress and/or strain during expansion and/or contraction, etc.), a target capacity (which can be estimated by a linear interpolation between the capacity of silicon and the capacity of the dopant), a function of the dopant, and/or any suitable property. The concentration can be a mass concentration, purity, atomic, stoichiometric, volumetric, and/or any suitable concentration.

The dopant(s) are preferably crystallogens (also referred to as a Group 14 elements, adamantogens, Group IV elements, etc. such as carbon, germanium, tin, lead, etc.). However, the dopant(s) can additionally or alternatively include: chalcogens (e.g., oxygen, sulfur, selenium, tellurium, etc.), pnictogens (e.g., nitrogen, phosphorous, arsenic, antimony, bismuth, etc.), Group 13 elements (also referred to as Group III elements such as boron, aluminium, gallium, indium, thallium, etc.), halogens (e.g., fluorine, chlorine, bromine, iodine, etc.), alkali metals (e.g., lithium, sodium, potassium, rubidium, caesium, etc.), alkaline earth metals, transition metals, lanthanides, actinides, and/or any suitable materials.

The dopants can be interstitial dopants (e.g., occupy interstitial sites), substitutional dopants (e.g., replace an atom within a lattice or other structure), surface dopants (e.g., occupy surface locations), grains, particles (e.g., with a particle size smaller than a particle of the silicon material, fitting within void space between particles, with a characteristic size between about 1 nm to 1 µm, etc.), and/or any suitable dopants. The dopants can additionally or alternatively form regions (e.g., grains, islands, etc.) with particles where the regions can be phase segregated, can form bonds (e.g., chemical bonds such as to form an alloy) with the silicon material, occupy void space within the particle, and/or can otherwise be present in the silicon material. For example, when the dopant is carbonaceous, the carbon can be present as graphite, graphene, nanotubes, nanoribbons, nanodots, graphene oxide, reduced graphene oxide, graphite oxide, polymer, amorphous carbon, diamond, fullerene, and/or have any suitable structure and/or allotrope. Variations of this example where the carbon is present as graphite (and potentially nanocarbon allotropes) can be beneficial for contributing to the capacity of the silicon material and therefore preferably represents at least about 90% of the dopant percentage (e.g., where the remaining 10% can be any form of carbon). For instance, if 1 gram of carbonaceous material were present, at least 0.9 g is preferably graphitic (or other forms of nanocarbon). In other variations, particularly but not exclusively when the carbonaceous material does not contribute to the capacity of the silicon material, the total concentration of the carbonaceous material within the silicon material is preferably less than about 10% (e.g., by mass, by volume, by elemental composition, etc.).

The dopants can be homogeneously distributed (e.g., as shown for example in FIG. 1A-1E or 2D) and/or heterogeneously distributed (e.g., as shown for example in FIGS.

2A-2C). Examples of heterogeneous distributions can include: greater dopant concentrations proximal an external surface of the silicon material, great dopant concentrations distal an external surface of the silicon material (e.g., greater concentration within the center or central region of the silicon material), a patterned dopant distribution (e.g., a radial distribution, a an azimuthal distribution, with a distribution that depends on a particle shape and/or a target particle shape, etc.), islands (e.g., regions of dopant and/or high dopant concentration), and/or any suitable inhomogeneous distribution. In variants, the dopants can be distributed in the same (e.g., collocated with, have a similar distribution profile as, etc.) or different (e.g., have a different distribution profile from) manner as stabilizing agents.

In a first illustrative example, a particle of the silicon material can include one or more grains (e.g., with a grain size between about 10 nm and 10 μm; with a grain size that depends on a size of the particle, cluster, agglomer, etc.; etc.) that include dopants and one or more grains (e.g., with a grain size between about 10 nm and 10 μm; with a grain size that depends on a size of the particle, cluster, agglomer, etc.; etc.) that are devoid of (e.g., include less than a threshold amount such as less than 1%, 5%, etc. of; have no detectable; etc.) the dopants. In a second illustrative example, a first particle of the silicon material can include dopants and a second particle of the silicon material can be substantially devoid of (e.g., include less than a threshold amount such as less than 1%, 5%, etc. of; have no detectable; etc.) dopants. In a third illustrative example, the dopants can have a greater concentration proximal (e.g., within a threshold distance such as 0.1, 0.5, 1, 2, 5, 10, 20, 50, etc. nanometers of) an exposed (e.g., to an external environment, to an internal void space, etc.) surface of the silicon material than proximal a central region (e.g., a region greater than a threshold distance from the exposed surface) of the silicon material (such as no dopants beyond the threshold distance). In a variation of the third illustrative example, a gradient of dopants can be present, for instance with a decreasing dopant concentration as the distance from an exposed surface of the silicon material increases. In a fourth illustrative example (as shown for example in FIGS. 2A-2D), any or all of the first through third illustrative examples can be combined. However, the dopant(s) can be distributed in any manner.

The silicon material can include one or more dopant type (e.g., two dopants, three dopants, four dopants, five dopants, ten dopants, etc.) and/or any suitable dopants.

The dopant(s) can be intentionally added to the silicon material, be incidentally present in the silicon material (e.g., dopants that are present in a silica precursor that remain present in the resulting silicon), and/or can otherwise be introduced or present in the silicon material.

The stabilizing agent(s) 300 preferably function to increase a stability (e.g., chemical stability to resist chemical wear; mechanical stability to resist mechanical wear; cyclability of the silicon material to expansion/contraction, charging/discharging, and/or other cyclable processes; etc.) of the silicon material. The stabilizing agent(s) can additionally or alternatively modify an electrical (e.g., capacity) or other property of the silicon material, and/or can otherwise function. The stabilizing agent is typically different from the dopant, but can be the same as the dopant.

The stabilizing agent is preferably oxygen (e.g., forming silicon oxides within the silicon material), but can additionally or alternatively include other chalcogens (e.g., sulfur, selenium, tellurium, polonium, etc.), pnictogens (e.g., nitrogen, phosphorous, arsenic, antimony, bismuth, etc.), and/or any suitable elements and/or molecules (e.g., one or more dopants materials). The stabilizing agent can additionally or alternatively include carbon (e.g., as a carbon coating; such as monolayer graphene, multilayer graphene, graphite, carbon black, amorphous carbon, etc.), germanium, tin, lead, and/or other suitable elements, molecules, and/or materials. Carbon used as a stabilizing agent can be pure carbon and/or can form doped or functionalized species. Examples of doped and/or functionalized carbon include: oxides of carbon (e.g., graphene oxide, graphite oxide, etc.), organochalcogens (e.g., organochalcogen materials; carbon materials including sulfur, selenium, polonium, etc.; etc.), organopnictogens (e.g., organopnictogen materials; carbon material including nitrogen, phosphorous, arsenic, antimony, bismuth, etc.), and/or other suitable elements and/or molecules (e.g., one or more dopant materials) to form doped and/or functionalized carbon materials.

The stabilizing agent can be native (e.g., a native oxide that forms on the silicon material when the silicon material is exposed to an environment that includes oxygen), controlled (e.g., introduced in a predetermined amount and/or manner), and/or can otherwise be introduced or present (e.g., present as unreacted silica from the silica precursor, present in the silica precursor, etc.).

The stabilizing agent concentration (e.g., mass concentration, volume concentration, stoichiometric concentration, etc.) in the silicon material is preferably at most 50% (e.g., 0%, 1%, 2%, 5%, 10%, 20%, 25%, 30%, 40%, 50%, values therebetween, etc.), but can be greater than 50%. The stabilizing agent concentration can refer to a total stabilizing agent concentration (e.g., for all stabilizing agents when more than one stabilizing agent is present), a specific stabilizing agent concentration (e.g., for a particular stabilizing agent), and/or any suitable concentration.

The stabilizing agents are typically inhomogeneously distributed within the silicon material, but can be homogeneously distributed and/or distributed in any manner. In a first illustrative example, a particle of the silicon material can include one or more grains (e.g., with a grain size between about 10 nm and 10 μm; with a grain size that depends on a size of the particle, cluster, agglomer, etc.; etc.) that include stabilizing agent and one or more grains (e.g., with a grain size between about 10 nm and 10 μm; with a grain size that depends on a size of the particle, cluster, agglomer, etc.; etc.) that are devoid of (e.g., include less than a threshold amount such as less than 1%, 5%, etc. of; have no detectable; etc.) the stabilizing agent. In a second illustrative example, a first particle of the silicon material can include stabilizing agent and a second particle of the silicon material can be substantially devoid of (e.g., include less than a threshold amount such as less than 1%, 5%, etc. of; have no detectable; etc.) stabilizing agent. In a third illustrative example, the stabilizing agent can have a greater concentration proximal (e.g., within a threshold distance such as 0.1, 0.5, 1, 2, 5, 10, 20, 50, etc. nanometers of) an exposed (e.g., to an external environment, to an internal void space, etc.) surface of the silicon material than proximal a central region (e.g., a region greater than a threshold distance from the exposed surface) of the silicon material. In a variation of the third illustrative example, a gradient of stabilizing agent can be present, for instance with a decreasing stabilizing agent concentration as the distance from an exposed surface of the silicon material increases. In a fourth illustrative example (as shown for example in FIGS. 2A-2D), any or all of the first through third illustrative examples can be combined. However, the stabilizing agent can be distributed in any manner.

The distribution of the stabilizing agents can depend on and/or be independent of the dopant distribution. For example, regions of high dopant concentration (e.g., local dopant concentration) can have high stabilizing concentration. In another example, the dopants can be uniformly distributed through a particle and stabilizing agents can be concentrated in grains, near a surface (e.g., a surface proximal an external environment, exposed surface, etc.), and/or can otherwise be distributed.

An external expansion (e.g., volumetric expansion, areal expansion, linear expansion along one more directions, etc. such as resulting from lithiation, thermal expansion, metalation, etc.) of the silicon material (and/or particles thereof) is preferably less than about 50% (e.g., compression such as a negative expansion, 0%, 5%, 10%, 20%, 30%, 40%, 50%, values or ranges therebetween, etc.), but can be greater than 50%. The external expansion can be achieved, for instance, by enabling internal expansion (e.g., an internal void space) within the silicon material where the silicon material can expand internally (e.g., before, in addition to, in the alternative to, etc. expanding externally such as into an external environment proximal the silicon material). However, the external expansion can otherwise be achieved (e.g., by modifying a lattice constant, density, or other properties of the silicon material, by accommodating stress such as using a dopant or dopant particles to accommodate expansion stress, etc.). In some variants, a greater external expansion can be accommodated. For example, the presence of dopants within a particle can enable a larger external expansion to be accommodated.

The surface area of the exterior surface of the silicon material (e.g., an exterior surface of the particles, an exterior surface of a cluster of particles, an exterior surface of an agglomer of particles and/or clusters, etc.) is preferably small (e.g., less than about 0.01, 0.5 m$^2$/g, 1 m$^2$/g, 2 m$^2$/g, 3 m$^2$/g, 5 m$^2$/g, 10 m$^2$/g, 15 m$^2$/g, 20 m$^2$/g, 25 m$^2$/g, 30 m$^2$/g, 50 m$^2$/g, values or between a range thereof), but can be large (e.g., greater than 10 m$^2$/g, 15 m$^2$/g, 20 m$^2$/g, 25 m$^2$/g, 30 m$^2$/g, 50 m$^2$/g, 75 m$^2$/g, 100 m$^2$/g, 110 m$^2$/g, 125 m$^2$/g, 150 m$^2$/g, 175 m$^2$/g, 200 m$^2$/g, 300 m$^2$/g, 400 m$^2$/g, 500 m$^2$/g, 750 m$^2$/g, 1000 m$^2$/g, 1250 m$^2$/g, 1400 m$^2$/g, ranges or values therebetween, >1400 m$^2$/g) and/or any suitable value.

The surface area of the interior of the silicon material (e.g., a surface exposed to an internal environment that is separated from with an external environment by the exterior surface, a surface exposed to an internal environment that is in fluid communication with an external environment across the exterior surface, interior surface, etc. such as within a particle, cooperatively defined between particles, between clusters of particles, between agglomers, etc.) is preferably large (e.g., greater than 10 m$^2$/g, 15 m$^2$/g, 20 m$^2$/g, 25 m$^2$/g, 30 m$^2$/g, 50 m$^2$/g, 75 m$^2$/g, 100 m$^2$/g, 110 m$^2$/g, 125 m$^2$/g, 150 m$^2$/g, 175 m$^2$/g, 200 m$^2$/g, 300 m$^2$/g, 400 m$^2$/g, 500 m$^2$/g, 750 m$^2$/g, 1000 m$^2$/g, 1250 m$^2$/g, 1400 m$^2$/g, ranges or values therebetween, >1400 m$^2$/g), but can be small (e.g., less than about 0.01, 0.5 m$^2$/g, 1 m$^2$/g, 2 m$^2$/g, 3 m$^2$/g, 5 m$^2$/g, 10 m$^2$/g, 15 m$^2$/g, 20 m$^2$/g, 25 m$^2$/g, 30 m$^2$/g, 50 m$^2$/g, values or between a range thereof). However, the surface area of the interior can be above or below the values above, and/or be any suitable value.

Figure 1A:
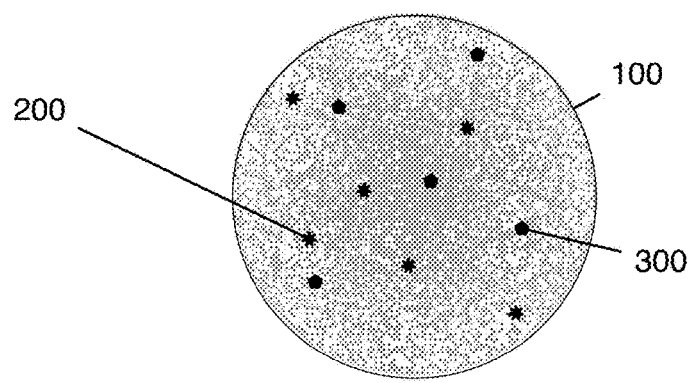
FIGS. 1A-1E are schematic representations of exemplary silicon particles.
Figure 1B:
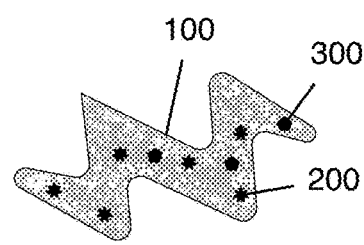
Figure 1C:
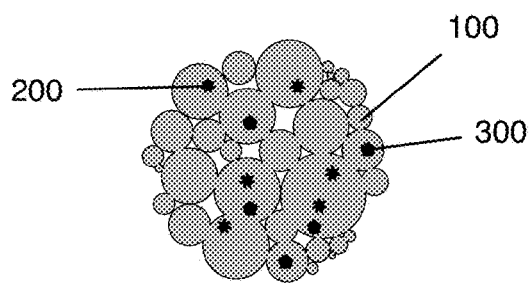
Figure 1D:
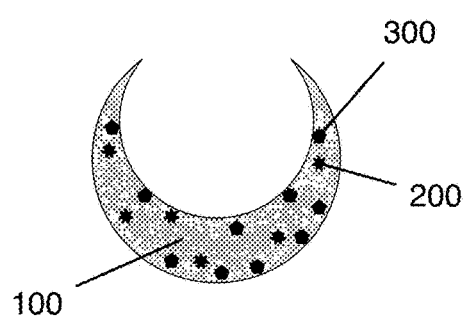
Figure 1E:
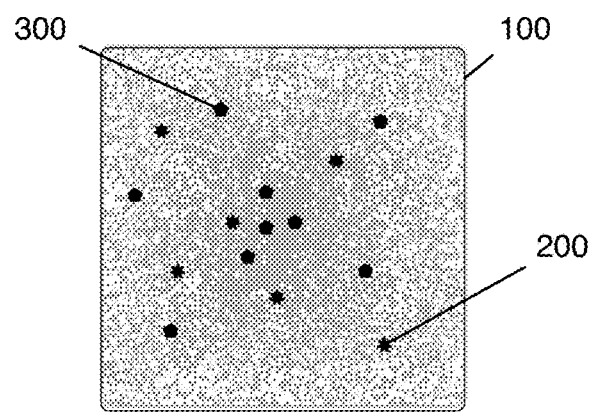
Figure 2A:
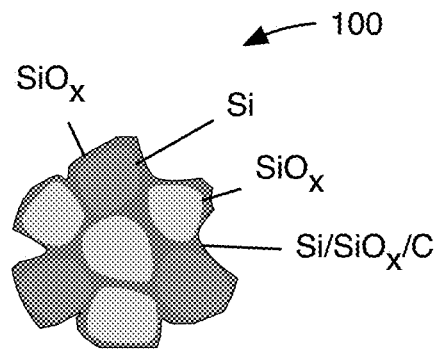
FIGS. 2A-2D are schematic representations of exemplary silicon particles.
Figure 2B:
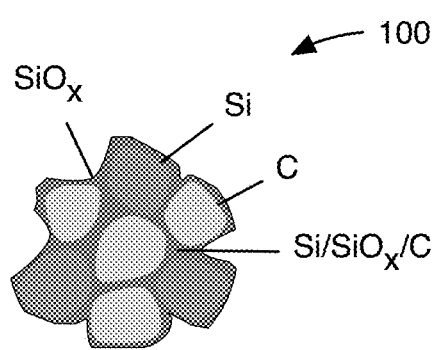
Figure 2C:
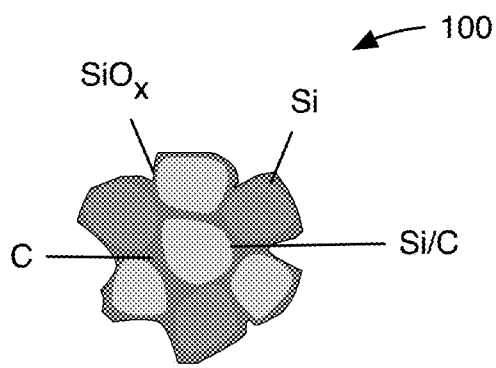
Figure 2D:
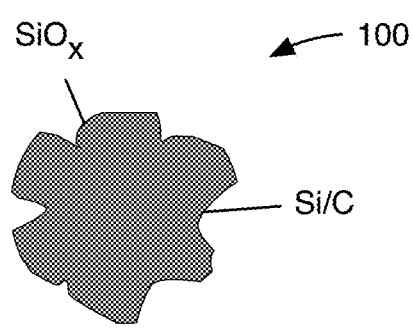

The shape of the particles can be spheroidal (e.g., spherical, ellipsoidal, as shown for example in FIG. 1A or 1C, etc.); rod; platelet; star; pillar; bar; chain; flower; reef; whisker; fiber; box; polyhedron (e.g., cube, rectangular prism, triangular prism, as shown for example in FIG. 1E, etc.); have a worm-like morphology (as shown for example in FIG. 1B, vermiform, etc.); have a foam like morphology; have an egg-shell morphology; have a shard-like morphology (e.g., as shown for example in FIG. 1D); and/or have any suitable morphology.

The particles 100 can be nanoparticles, microparticles, mesoparticles, macroparticles, and/or any suitable particles. The particles can be discrete and/or connected. In variations, the particles can form clusters, aggregates, agglomers, and/or any suitable structures (e.g., higher order structures). A characteristic size of the particles is preferably between about 1 nm to about 2000 nm such as 2 nm, 5 nm, 10 nm, 20 nm, 25 nm, 30 nm, 50 nm, 75 nm, 100 nm, 125 nm, 150 nm, 175 nm, 200 nm, 250 nm, 300 nm, 400 nm, 500 nm, 1000 nm, or 1500 nm. However, the characteristic size can additionally or alternatively be less than about 1 nm and/or greater than about 2000 nm. In specific examples, the characteristic size can include the radius, diameter, circumference, longest dimension, shortest dimension, length, width, height, pore size, a shell thickness, and/or any size or dimension of the particle. The characteristic size of the particles is preferably distributed on a size distribution. The size distribution can be a substantially uniform distribution (e.g., a box distribution, a mollified uniform distribution, etc. such that the number of particles or the number density of particles with a given characteristic size is approximately constant), a Weibull distribution, a normal distribution, a log-normal distribution, a Lorentzian distribution, a Voigt distribution, a log-hyperbolic distribution, a triangular distribution, a log-Laplace distribution, and/or any suitable distribution.

The particles can be freestanding, clustered, aggregated, agglomerated, interconnected, and/or have any suitable relation or connection(s). For example, the particles (e.g., primary structures) can cooperatively form secondary structures (e.g., clusters) which can cooperatively form tertiary structures (e.g., agglomers). A characteristic size (e.g., radius, diameter, smallest dimension, largest dimension, circumference, longitudinal extent, lateral extent, height, etc.) of the primary structures can be between about 2-150 nm. A characteristic size of the secondary structures can be 100 nm-2 µm. A characteristic size of the tertiary structures can be between about 1 µm and 10 µm. However, the primary, secondary, and/or tertiary structures can have any suitable extent.

The particles can be solid, hollow, porous, as shown for example in FIGS. 1A-1E, and/or have any structure. In some embodiments, particles can cooperatively form pores (e.g., an open internal volume, void space, etc.) within a cluster. For example, the pores can result from void space that remains after particle packing, because of imperfect packing efficiency (e.g., packing efficiency that is less than an optimal packing efficiency), because of a characteristic size distribution of the particles (e.g., distribution shape, distribution size, etc.), and/or can otherwise result. In a related example, a silicon material can include porous particles and the porous particles can cooperatively form pores. The pore distribution within the particles can be substantially the same as and/or different from (e.g., different sizes, different size distribution, different shape, etc.) the pores cooperatively defined between particles. The pore distribution (e.g., within a porous particle, cooperatively defined between pores, etc.) can have pore size (e.g., average size, mean size, etc.) between about 0.1 nm and about 5 µm, such as 0.2 nm, 0.5 nm, 1 nm, 2 nm, 5 nm, 10 nm, 20 nm, 25 nm, 30 nm, 40 nm, 50 nm, 75 nm, 100 nm, 150 nm, 200 nm, 300 nm, 400 nm, 500 nm, 750 nm, 1 µm, 1.5 µm, 2 µm, 3 µm, 4 µm, and/or 5 µm. However, the pore size can be less than 0.1 nm and/or greater than 5 µm. The pore size distribution can be monomodal or unimodal, bimodal, polymodal, and/or have any suitable number of modes. In specific examples, the pore size distribution can be represented by (e.g., approximated as) a gaussian distribution, a Lorentzian distribution, a Voigt distribution, a uniform distribution (e.g., all pores are within ±1%, ±2%, ±5%, ±10%, +20%, ±30%, etc. of a common pore size), a mollified uniform distribution, a triangle distribution, a Weibull distribution, power law distribution, log-normal distribution, log-hyperbolic distribution, skew log-Laplace distribution, asymmetric distribution, skewed distribution, and/or any suitable distribution. However, the pores can be described by any suitable distribution.

Each particle can be the same (e.g., identical properties, properties that are lie on a common property distribution, etc.) and/or different (e.g., include a first plurality of particles defined by a first property distribution and a second plurality of particles defined by a second property distribution where the first and second distributions can be different such as different characteristic values) from other particles. Exemplary property distributions include: size distribution (e.g., characteristic size, average size, etc.), morphologies (e.g., shapes), composition (e.g., percentage of silicon, dopant, stabilizing agent, etc.), surface area, external expansion, and/or any suitable properties.

Figure 4:
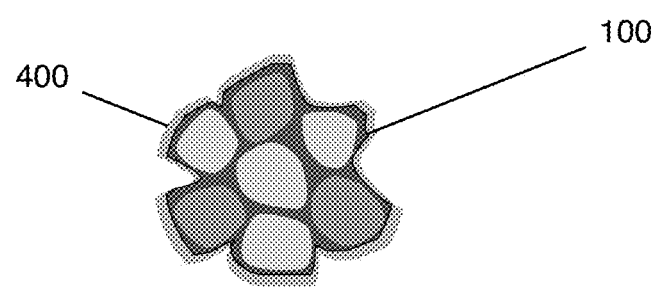
FIG. 4 is a schematic representation of an example of a coated silicon particle.

The silicon material can optionally include a coating 400, which can function to modify (e.g., tune, improve, change, decrease, etc.) a physical, chemical, electrical, and/or other properties of the silicon material. The coating is preferably disposed on the external surface of the silicon material, but can additionally or alternatively be formed on an internal surface of the silicon material. The coating is preferably homogeneous (e.g., substantially uniform surface coverage; substantially uniform thickness such as varies by at most 1%, 2%, 5%, 10%, 20%, etc. across the silicon material; as shown for example in FIG. 4; etc.), but can be inhomogeneous (e.g., patterned, on a given particle, between particles, on a given cluster, between clusters, on an agglomer, between different agglomers, etc.).

In some variations, dopants of the silicon material can lead to (e.g., promote) a more homogeneous coating. In an illustrative example, carbon dopants (particularly dopants near the particle surface) can act as coating growth sites (where the coating growth can then propagate from the growth sites). In another illustrative example, an inhomogeneous dopant distribution can lead to an inhomogeneous coating (e.g., where the coating can be partially matched to the dopant distribution). In another illustrative example, carbon dopants can diffuse to (e.g., proximal to, within a threshold distance of, etc.) a surface of the silicon material, which can promote a conformal carbon coating (e.g., with graphene, graphite, amorphous carbon, etc.).

The coating thickness is preferably a value or range thereof preferably between about 0.3-10 nm such as 0.3 nm, 0.345 nm, 0.7 nm, 1 nm, 2 nm, 2.5 nm, 3 nm, 4 nm, 5 nm, 6 nm, 7 nm, 8 nm, 9 nm, 10 nm, and/or values therebetween. However, the coating thickness can be less than 1 nm or greater than 10 nm. The coating thickness can be substantially the same and/or vary over the extent of the silicon material. The coating thickness can be chosen to allow ions (e.g., Li$^+$ ions) and/or other materials (e.g., electrolytes) to penetrate the coating, to be impenetrable to ions, can include one or more pores and/or perforations to enable the materials to pass through (e.g., at predetermined locations), and/or electrolyte and/or otherwise be permeable to one or more substances. The coating thickness can depend on the coating material, the silicon material (e.g., the dopant concentration, the stabilizing material concentration, the dopant material, the stabilizing agent material, thickness of a stabilizing agent layer or layer that includes stabilizing agent, etc.), a target anode property of the silicon material (e.g., capacity), a target application of the silicon material, and/or otherwise depend on the silicon material.

The coating material is preferably carbonaceous, but can additionally or alternatively include metal (e.g., lithium, sodium, magnesium, etc.), oxides (e.g., SiO$_x$), inorganic polymers (e.g., polysiloxane), metallopolymers, and/or any suitable materials. Examples of carbonaceous materials include: organic molecules, polymers (e.g., polyethylene (PE), polypropylene (PP), polyvinyl chloride (PVC), polystyrene (PS), polyurethane (PU), polyamide, polyacrylonitrile (PAN), polyacrylamide, polylactic acid, polyethylene terephthalate (PET), phenolic resin, polypyrrole, polyphenylene vinylene, polyacetylenes, polyfluorene, polyphenylene, polypyrene, polyazulene, polynapthalene, polycarbazole, polyindole, polyazepine, polyaniline, polythiophene, polyphenylene sulphide, poly(3,4-ethylenedioxythiophene), recycled polymers, etc.); inorganic carbon (e.g., amorphous carbon, charcoal, diamond, graphite, graphene, nanorods, etc.), and/or any suitable carbonaceous materials.

The coating material can optionally be cyclized (e.g., crosslinked) which can function to improve a stability of the coating, form a carbon fiber, and/or can otherwise function. For example, when the coating material includes PAN, the PAN can be cyclized (e.g., thermally cyclized such as at a temperature between about 100° C.-500° C. for a duration between about 0.5 hr and 24 hrs). However, any suitable coating material can be cyclized.

When the additive is carbonaceous, the carbon to silicon material ratio (e.g., the ratio of the coating material to the silicon material inclusive of any carbon that may be present in the silicon material, the ratio of carbon to silicon within the silicon material, the ratio of carbon to other elements within the silicon material, etc. such as mass ratio, stoichiometric ratio, volumetric ratio) can be approximately 1:8, 1:7, 1:6, 1:5, 1:4, 1:3, 1:2, 2:1, 3:1, 4:1, 5:1, 6:1, 7:1, 8:1, and/or any other ratio. However, any carbon to silicon ratio can be used. The carbon to silicon ratio (e.g., controlled based on coating thickness, coating uniformity, etc.) can depend on a stabilizing agent concentration (e.g., an oxygen concentration within the silicon material), a target capacity, a dopant concentration, a particle size (e.g., characteristic size), a cluster size, an agglomer size, a surface area (e.g., external surface area, etc.), and/or depend on any suitable property.

In some embodiments, the silicon material can have a structure (particularly but not exclusively an interior structure) that is substantially the same as that described for a silicon material disclosed in U.S. patent application Ser. No. 17/322,487 titled 'POROUS SILICON AND METHOD OF MANUFACTURE' and filed 17 May 2021, which is incorporated in its entirety by this reference. However, the silicon material can have any suitable structure.

In an illustrative example, a particle can include a majority of silicon (e.g., at least 50% Si by mass, by volume, by stoichiometry, by number of atoms, etc.), a carbon dopant (e.g., where the particle can have a carbon concentration between about 0% and 45% by mass, by volume, by stoichiometry, by number of atoms, etc.), and oxygen stabilizing agent (e.g., where the particle can have a stabilizing agent concentration between about 5% and 50% by mass, by volume, by stoichiometry, by number of atoms, etc.). However, the particle can include any suitable constituents (e.g., impurities, additional or alternative dopants, etc.) in any suitable concentration, and can serve any suitable purpose (e.g., a stabilizing agent can function as an additive such as to stabilize a particle or dispersion; function to modify a mechanical, electrical, or other property of the particle; etc.).

In a second illustrative example, the silicon material can be or include porous carbon infused silicon, porous carbon decorated silicon structure, porous silicon carbon hybrid, a porous silicon carbon alloy, a porous silicon carbon composite, silicon carbon alloy, silicon carbon composite, carbon decorated silicon structure, carbon infused silicon, carborundum, silicon carbide, and/or any suitable allotrope or mixture of silicon, carbon, and/or oxygen. For instance, the elemental composition of the silicon material can include SiOC, SiC, $Si_xO_xC$, $Si_xO_xC_y$, $SiO_xC_y$, $Si_xC_y$, $SiO_x$, $Si_xO_y$, $SiO_2C$, $SiO_2C_x$, SiOCZ, SiCZ, $Si_xO_xCZ$, $Si_xO_xC_xZ_x$, $Si_xC_xZ_y$, $SiO_xZ_x$, $Si_xO_xZ_y$, $SiO_2CZ$, $SiO_2C_xZ_y$, and/or have any suitable composition (e.g., include additional element(s)), where Z can refer to any suitable element of the periodic table and x and/or y can be the same or different and can each be between about 0.001 and 2 (e.g., 0.001, 0.005, 0.01, 0.05, 0.1, 0.5, 1, 2, 0.001-0.05, 0.01-0.5, 0.01-0.1, 0.001-0.01, 0.005-0.1, 0.5-1, 1-2, values or ranges therebetween etc.), less than 0.001, or greater than 2.

4. Method

The method preferably functions to manufacture a silicon material as described above, but can function to manufacture any silicon material. As shown in FIG. 3, the method can include reducing a silica precursor. The manufacturing method can optionally include processing the silica precursor, processing the silicon, and/or any suitable steps. Steps of the method can be prepared in a continuous process (e.g., sequentially without significant delays between steps), in batches, in contemporaneous or simultaneous processes, using delayed processes, and/or with any suitable timing.

The method and/or steps thereof can be performed in a single chamber (e.g., a furnace, an oven, etc.) and/or in a plurality of chambers (e.g., a different chamber for each step or substep, a heating chamber, a coating chamber, a milling chamber, a washing chamber, etc.). The method can be performed on a laboratory scale (e.g., microgram, milligram, gram scale such as between about 1 μg and 999 g, etc.), manufacturing scale (e.g., kilogram, megagram, etc. such as between about 1 kg and 999 Mg), and/or any suitable scale.

The resulting silicon can have substantially the same morphology and/or structure as the silica precursor (e.g., retain the same shape with a change in lattice constant and/or size commensurate with the change in lattice spacing between silica and silicon, be fused at points of contact between particles, have an identical appearance with the same or different size, etc.) and/or a different morphology and/or structure from the silica precursor (e.g., form shards, break, fuse, have different size or morphology, etc.). However, the resulting silicon can have any suitable morphology.

The silica precursor (e.g., silica starting material) can include waste silica (e.g., silica generated as a byproduct from another process such as waste, residual, etc. silica from a silicon purification process; silica produced during silicon production for solar, semiconductor, etc.; silica that would otherwise be disposed of; etc.), recycled silica (e.g., silica recycled or repurposed after a different use), pristine silica (e.g., newly manufactured silica), and/or any suitable silica starting material. Exemplary silica starting materials include: sol-gel silica (e.g., silica prepared according to the Stöber method), fume silica, diatoms, glass, quartz, fumed silica, silica fumes, Cabosil fumed silica, aerosil fumed silica, sipernat silica, precipitated silica, silica gels, silica aerogels, decomposed silica gels, silica beads, silica sand, and/or any suitable silica. For example, silica (e.g., silica fumes) remaining after purification of silica into silicon in the presence of carbon (e.g., coke, coal, wood chips, graphite, etc.) can be used for the silicon manufacture. In this example (and related examples of silica recovered or used from different processes), the resulting silica typically has residual carbon (e.g., carbon impurities, carbon dopants, etc.). The amount of residual carbon can depend on the process (e.g., temperature, time, etc.), the ratio of silica to carbon used in the process, depend on a number of times the silica is processed (e.g., the silica is recycled, subject to the process more than once, etc.), the structure of the silica prior to the process (e.g., the source of the silica for the silicon), the carbon (e.g., carbon source, carbon morphology, carbon allotrope, etc.), and/or any suitable aspect(s) of the process or materials.

Reducing the silica precursor can be performed as and/or include any steps as disclosed in U.S. patent application Ser. No. 17/322,487 titled 'POROUS SILICON AND METHOD OF MANUFACTURE' and filed 17 May 2021, which is incorporated in its entirety by this reference. However, reducing the silica precursor can be performed in any manner.

As an illustrative example, reducing the silica precursor can include: mixing the silica precursor with a salt (e.g., sodium chloride), mixing the silica precursor with a reducing material (e.g., magnesium, aluminium, etc.), and heating the silica precursor to a reduction temperature (e.g., 500° C., 600° C., 700° C., 800° C., 900° C., 1000°, 1200° C., temperatures therebetween, etc.) for between 1-24 hours. In variants of this illustrative example, the silica precursor can be heated to one or more intermediate temperatures (e.g., a temperature below the reduction temperature; 200° C., 250° C., 300° C., 400° C., 500° C., 600° C., 700° C., values therebetween, etc.; etc.) for an amount of time (e.g., 30 minutes to 24 hours) before heating the silica precursor to the reduction temperature. However, the silica precursor can otherwise be reduced.

5. Specific Examples

In a first specific example, a silicon material can include at least 50% silicon, and between 0.1-45% carbon, where the percentages can refer to a mass percentage of each component. In this specific example, the silicon material can include at most about 5% oxygen.

In a second specific example, a silicon material can include approximately 85-93% silicon, approximately 2-10% carbon, and approximately 5-10% oxygen, where the percentages can refer to a mass percentage of each component. In a first variation of the second specific example, the silicon material can include about 85% silicon, about 5% oxygen, and about 10% carbon. In a second variation of the second specific example, the silicon material can include 85% silicon, 10% oxygen, and 5% carbon. In a third variation of the second specific example, the silicon material can include 93% silicon, 2% carbon, and 5% oxygen. However, the silicon material can include any suitable composition.

In the first and second specific examples, the silicon material can additionally or alternatively include trace impurities (e.g., representing less than about 1% of the mass of the silicon material). For instance, the silicon material can be composed essentially of silicon, oxygen, and carbon. Exemplary impurities can include: oxides (e.g., sulfur oxides such as SO, $SO_2$, $SO_3$, $S_7O_2$, $S_6O_2$, $S_2O_2$, etc.; sodium oxide;

potassium oxide; aluminium oxide; iron oxides such as FeO, $Fe_3O_4$, $Fe_2O_3$, etc.; magnesium oxide; water; nitrogen oxides such as NO, $NO_2$, $NO_3$, $N_2O$, $N_2O_2$, $N_2O_3$, $N_2O_4$, $N_2O_5$, etc.; etc.), chlorides (e.g., sodium chloride, potassium chloride, chlorine, etc.), and/or any suitable impurities.

In the first and second specific examples, the silicon material preferably has a large internal surface area (e.g., an internal surface area between about 50-1500 $m^2/g$; an internal void space between 5-90%; a porosity between 5-90%; etc.). The silicon material in the first and second specific examples preferably has a small external surface area (e.g., an external surface area less than about 100 $m^2/g$). However, the silicon material of the first and second specific examples can have any suitable (internal or external) surface area.

In the first and second specific example, the silicon material preferably has a volume expansion (e.g., external volume expansion; such as thermal expansion; expansion due to lithium intercalation, diffusion, etc.; etc.) of at most 40% (e.g., <0%, 1%, 2%, 5%, 10%, 15%, 20%, 25%, 30%, 35%, etc.), but can have any suitable volume expansion.

The methods of the preferred embodiment and variations thereof can be embodied and/or implemented at least in part as a machine configured to receive a computer-readable medium storing computer-readable instructions. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A silicon material comprising:
  a primary structure comprising silicon nanoparticles with primary sizes between about 2 nanometers (nm) and about 150 nm;
  a secondary structure comprising clusters of the silicon nanoparticles, the clusters having a cluster size between about 100 and 1000 nm; and
  a composition of about 1-10% carbon by mass, about 5-10% oxygen by mass, and about 80-94% silicon by mass.

2. The silicon material of claim 1, wherein the silicon nanoparticles comprise a non-spheroidal morphology.

3. The silicon material of claim 1, wherein a size distribution of the silicon nanoparticles is substantially uniform.

4. The silicon material of claim 1, wherein the silicon nanoparticles form an interconnected network in the clusters.

5. The silicon material of claim 1, wherein the carbon of the composition comprises graphite.

6. The silicon material of claim 1, further comprising a carbonaceous coating comprising at least one of amorphous carbon, polymer, or graphitic carbon.

7. The silicon material of claim 6, wherein the carbonaceous coating comprises PAN, wherein the PAN is cyclized.

8. The silicon material of claim 1, wherein the silicon nanoparticles cooperatively form primary pores within the clusters, wherein a pore size of the primary pores is between 0.5 nm and 200 nm.

9. The silicon material of claim 1, wherein the silicon nanoparticles are manufactured from silica fumes.

10. The silicon material of claim 1, wherein the carbon composition is selected based on at least one of a target electrical conductivity or a target ionic conductivity of the silicon material.

11. A battery anode comprising a porous silicon material with a composition of at least 50% silicon by mass and between 1-45% carbon by mass, wherein an external volume expansion of the porous silicon material is at most 40%, wherein the porous silicon material comprises an internal surface area between about 50-1500 $m^2/g$.

12. The battery anode of claim 11, wherein an external surface area of the porous silicon material is between about 1-50 $m^2/g$.

13. The battery anode of claim 11, wherein the porous silicon material further comprises at most about 5% oxygen by mass.

14. The battery anode of claim 13, wherein the silicon nanoparticles are non-spheroidal.

15. The battery anode of claim 13, wherein the silicon nanoparticles are manufactured from fumed silica.

16. The battery anode of claim 13, wherein the silicon nanoparticles cooperatively form clusters with a characteristic size between about 100-1000 nm.

17. The battery anode of claim 11, wherein the porous silicon material comprises a carbonaceous coating.

18. The battery anode of claim 17, wherein the carbonaceous coating comprises polyacrylonitrile.

19. The battery anode of claim 11, wherein the porous silicon material further comprises a substantially isotropic tortuosity.

* * * * *